Oct. 25, 1966 G. B. STONE ETAL 3,280,962
GUIDING MEANS FOR CONTAINER HANDLING CONVEYORS
Filed June 11, 1964
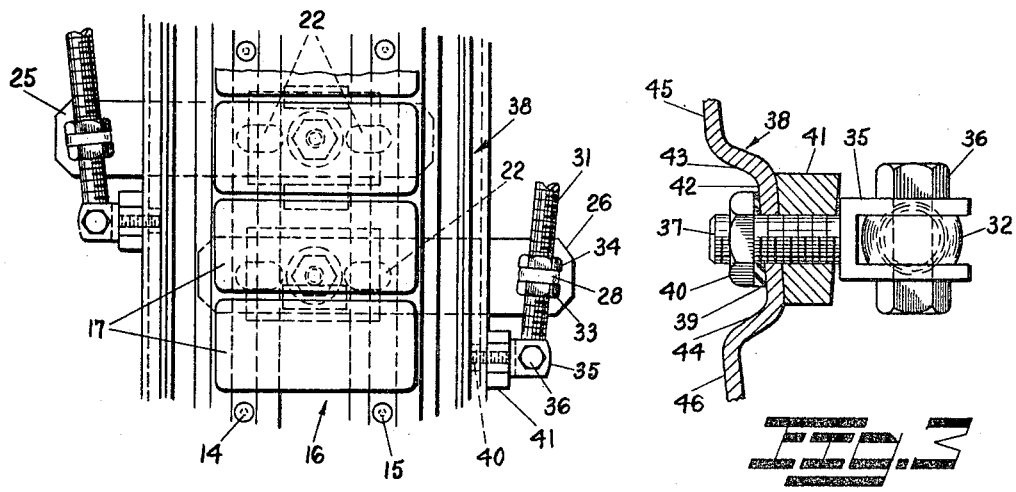
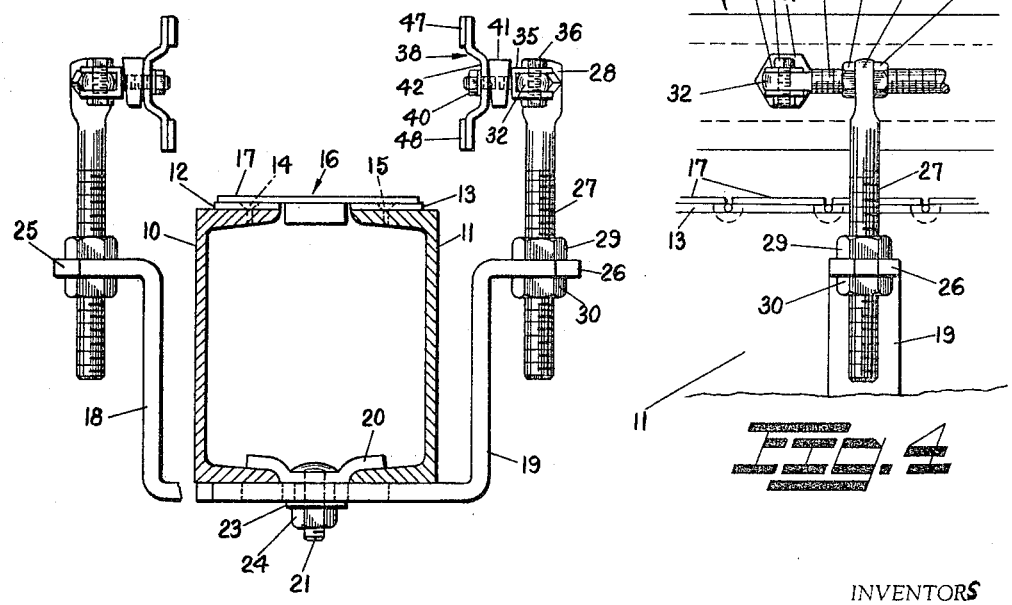
INVENTORS
GUTHRIE B. STONE,
MERTON L. ENGLERT,
BY JOSEPH TICE.
Albert R. Mahassel
ATTORNEY United States Patent Office 3,280,962
Patented Oct. 25, 1966

3,280,962
GUIDING MEANS FOR CONTAINER HANDLING CONVEYORS
Guthrie B. Stone, Honeoye, Merton L. Englert, Springwater, and Joseph Tice, Hemlock, N.Y., assignors to Stone Conveyor Company, Inc., Honeoye, N.Y., a corporation of New York
Filed June 11, 1964, Ser. No. 374,412
3 Claims. (Cl. 198—204)

This invention pertains to a machine for conveying product containers and, more particularly, to an improved means of guiding said containers thereon.

It is a general object of the invention to provide guiding side rails to extend along the sides of a conveyor machine.

A further object is to provide adjustable container guiding side rails which will permit the conveyor machine to which they are attached to run at greater speed than heretofore possible.

A still further object is to provide a conveyor with side rails that can be selectively adjusted to accommodate the size and shape of a particular product or product container.

A further and more specific object is to provide adjustable side rails which may be selectively tilted on their vertical axes so as to bring the guiding edges thereof into close proximity with the irregular configuration of many known forms of product containers.

Further objects and advantages of the invention will become apparent from the following more detailed disclosure.

Many known forms of conveying mechanisms are utilized to move products and product containers from one point to another during the processing thereof. Irregular or odd-shaped containers such as necked bottles or the like because of their configuration and material from which they are made must be conveyed with considerable care and at a moderate rate of speed.

When transferring such containers from one conveyor to another by means of a transferring disc or moving said containers along curved sections of the conveying means, the speed at which the mechanism is permitted to operate is a very important factor for obvious reasons. At these transferring and curved portions of conveyor mechanisms guiding side rails are normally utilized for maintaining the containers in position on the conveying portion of the mechanism.

The novelty of the instant invention lies in the multiple direction adjustability of guiding side rails which are adapted to be assembled along the sides of and to extend upwardly from the conveying member. The conveying member may be of any of the known types such as belts, chains, links, etc.

These side rails are selectively adjustable in a vertical plane as well as laterally which permits them to be moved toward or away from the conveying member. Additionally the mechanism utilized for vertical and lateral adjustment of the side rails includes cam members for tilting said side rails on their vertical axes, whereby the guiding surfaces thereof may be moved into close proximity with the outer surface of irregular shaped products or containers.

The invention will hereinafter be described in greater detail by reference to a specific embodiment thereof as illustrated in the accompanying figures of drawing, wherein:

FIG. 1 is an end view and partially in section of a conveying machine and the mechanism according to the invention applied thereto;

FIG. 2 is a plan view of the mechanism shown in FIG. 1;

FIG. 3 is an end view and partially in section showing more clearly those adjustment features illustrated in FIGS. 1 and 2 which permit the guiding side rails to be tilted on their vertical axes; and FIG. 4 is a view in side elevation of the adjustment features which permit vertical and lateral adjustment of the guiding side rails.

Now referring to the figures of drawing, enough of a container handling conveyor is shown in FIGS. 1 and 2 to serve as a basis for a detailed description of the invention applied thereto.

In FIG. 1 there is shown a conveyor bed comprising opposed channel members 10 and 11 having wear resistant strip members 12 and 13 attached to the upper surfaces thereof by means of countersunk screws 14 and 15, respectively.

A table top type conveyor chain generally indicated by numeral 16 is movable longitudinally in a known manner over the top of the conveyor bed and in contact with the wear resistant strip members 12 and 13. The type of conveyor chain illustrated (FIG. 2) comprises a plurality of interconnected plate-like members 17; however, it should be understood the mechanism comprising the invention is not restricted to this type of chain but would be equally effective if applied in combination with any of the known forms of conveying members. The means utilized to drive the conveyor member is well known to those conversant in the art and further reference to such means is considered unnecessary at this time.

The mechanism according to the invention includes angularly formed mounting brackets 18 and 19 which are in step form having the lower portion thereof adjustably attached to the underside of the channel members 10 and 11.

This means of attachment includes a bolt anchor 20 disposed within the conveyor bed and formed to seat at the lower portion thereof intermediate the channel members 10 and 11. The bolt anchor is provided with a centrally disposed aperture which is adapted to receive a bolt 21 the shank of which passes through one of a plurality of slots 22 (FIG. 2) provided in the lower portions of mounting brackets 18 and 19. These slots 22 enable the mounting brackets to be assembled in spaced or abutting relation to the conveyor bed channel members 10 and 11 and being movable within the limits of each individual slot finer lateral adjustment of said brackets is provided. A washer 23 and nut 24 assemble on bolt 21 for attaching the mounting brackets 18 and 19 securely to and in abutting relation to the lower side of the channel members 10 and 11. These mounting brackets extend outwardly from the conveyor bed in a lateral direction for a portion of their length and thence upwardly for an additional portion of their length to a position below the upper surface of said conveyor bed where they terminate in the form of outwardly directed horizontal shelves 25 and 26, respectively.

Mounting brackets 18 and 19 are interchangeable and since the side rails assemble and adjust in a like manner on each side of the conveyor member and bed therefor it is only considered necessary for simplicity purposes to number and describe those parts of the invention as applied to one side of said conveyor member and bed.

Shelf 26 is provided with a centrally disposed aperture through which the threaded portion of a vertically adjustable supporting eye bolt 27 is adapted to extend. The top or upper portion of this bolt which includes the eye is indicated by numeral 28 and to maintain the bolt at its desired height lock nuts 29 and 30 are assembled on the threaded portion thereof. Lock nut 29 is assembled above the shelf 26 with lock nut 30 below said shelf and when both lock nuts are tightened into pressing contact with the shelf, the eye bolt 27 becomes fixedly positioned in the mounting bracket 19.

A second adjusting bolt 31 having an eye portion 32 formed at one end thereof assembles in and extends in a horizontal direction from each side of the top or upper portion 28 of eye bolt 27. Bolt 31 is threaded for the greater portion of its length and is provided with lock nuts 33 and 34 assembled thereon. The upper portion 28 assembles between the lock nuts 33 and 34 on bolt 31 and when said nuts are tightened against said upper portion, bolt 31 becomes fixedly positioned to support a guiding side rail which will be identified and more fully described hereinafter.

A clevis member 35 assembles to the eye portion 32 of the second adjusting bolt 31 by means of a bolt 36 which passes through the aligned apertures of said clevis and the eye portion 32 disposed within the bifurcated portion of said clevis. The stem or shank portion 37 of the clevis is threaded (FIG. 3) and extends inwardly to support a guiding side rail indicated generally by numeral 38 adjacent to the conveyor chain 16. The side rail 38 is retained in position by a resilient washer 39 and a nut 40 (FIG. 3) with a selectively turnable cam member 41 disposed intermediate said side rail and the shouldered portion of the clevis.

The side rails being adapted to extend along the sides of the conveyor member have a cross-sectional configuration as depicted in FIGS. 1 and 3 showing a recessed central portion 42, inwardly flared upper and lower sides 43 and 44 (FIG. 3) which terminate in generally vertical upper and lower guiding surfaces 45 and 46. As illustrated in FIG. 1, wear-resistant plastic strips 47 and 48, such as Delrin, Teflon, or nylon, are attached in any suitable manner to the guiding surfaces 45 and 46. The faces or guiding surfaces 45 and 46 of the side rails being covered with a wear-resistant material provide a low coefficient of friction as well as protecting the product or product container moving along the conveyor member.

In operation, the conveyor member moves over the bed portion in a well-known manner and the side rails disposed along the sides thereof serve to guide the items being carried by said conveyor member. The side rails may be adjusted vertically by simply loosening nuts 29 and 30 and retightening them against shelf 26 when the desired position of the side rails is obtained.

Lateral adjustment can be obtained by pivoting bolt 27 to move the side rails toward or away from the conveyor member. Additional lateral adjustment can be had by loosening nuts 33 and 34 to move the second adjusting bolt 31 in a horizontal direction and the retightening of said nuts will fixedly position this adjusting bolt.

The turning of the cam member 41 in one direction or the other causes the beveled or cam surface thereof which is in abutting relation with the outer surface of the side rail to tilt the latter on its vertical axis (FIG. 3).

This adjustability permits the guiding surfaces of the side rails to be moved into close proximity with odd and irregular shaped products or product containers being conveyed, thereby offering improved guiding means which will permit a conveying machine to operate at speeds greater than heretofore considered permissible.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:
1. For a conveyor adapted to handle product containers having a bed and a conveyor member movable across said bed, adjustable and opposed side rails extending upwardly from and along the sides of said conveyor member which comprise
   (a) a plurality of mounting brackets attached to and equally spaced along the length of each side of said bed,
   (b) vertically disposed and vertically adjustable eye bolts supported by and equal in number to said mounting brackets,
   (c) horizontally disposed side rail supporting and adjustment bolts threadably supported for longitudinal adjustment in the eye portion of said eye bolts,
   (d) the inner end of said supporting and adjustment bolts being pivotally attached to said side rails, and
   (e) selectively rotatable cam members disposed intermediate and in abutting relation with said side rails and the pivotable attachment point of said supporting and adjustment bolts for tilting said side rails on their vertical axes.

2. The mechanism according to claim 1 wherein said eye bolts are threadably adjustable in said mounting brackets to raise and lower said side rails relative to said bed and to swing said supporting and adjustment bolts in an arc for govering the distance between said opposed side rails.

3. The mechanism according to claim 1 wherein said supporting and adjustment bolts include a resilient washer disposed in abutting relation to said side rails for maintaining the latter in a selected position.

References Cited by the Examiner

UNITED STATES PATENTS 2,670,838   3/1954   Carter _____ 198—204

EVON C. BLUNK, *Primary Examiner.*

RICHARD E. AEGERTER, *Examiner.*